(12) United States Patent
Fitzgerald et al.

(10) Patent No.: US 11,816,302 B2
(45) Date of Patent: Nov. 14, 2023

(54) TECHNIQUES FOR USER INTERFACE LAYOUTS

(71) Applicant: EMC IP Holding Company LLC, Hopkinton, MA (US)

(72) Inventors: Robert Fitzgerald, Cork (IE); David P. Moloney, Cork (IE)

(73) Assignee: EMC IP Holding Company LLC, Hopkinton, MA (US)

(*) Notice: Subject to any disclaimer, the term of this patent is extended or adjusted under 35 U.S.C. 154(b) by 295 days.

(21) Appl. No.: 17/381,265

(22) Filed: Jul. 21, 2021

(65) Prior Publication Data

US 2023/0025614 A1    Jan. 26, 2023

(51) Int. Cl.
*G06F 3/0481*  (2022.01)
*G06T 11/20*   (2006.01)
*G06F 3/04855* (2022.01)

(52) U.S. Cl.
CPC ........ *G06F 3/0481* (2013.01); *G06F 3/04855* (2013.01); *G06T 11/206* (2013.01); *G06T 2200/24* (2013.01)

(58) Field of Classification Search
CPC .. G06F 3/0481; G06F 3/04855; G06T 11/206; G06T 2200/24
See application file for complete search history.

(56) References Cited

U.S. PATENT DOCUMENTS

| | | | |
|---|---|---|---|
| 5,808,914 A * | 9/1998 | Shin | G06F 40/177 703/2 |
| 6,603,493 B1 * | 8/2003 | Lovell | G06F 9/451 345/660 |
| 9,535,565 B2 * | 1/2017 | Vranjes | G06F 3/0481 |
| 10,133,704 B2 * | 11/2018 | Kota | G06F 40/103 |
| 11,068,146 B2 | 7/2021 | Fitzgerald et al. | |
| 2006/0031754 A1 * | 2/2006 | Lehenbauer | G06F 40/103 715/227 |
| 2007/0168859 A1 * | 7/2007 | Fortes | G06F 40/103 715/700 |
| 2008/0027895 A1 * | 1/2008 | Combaz | G06F 16/335 |
| 2013/0055055 A1 * | 2/2013 | Turcotte | G06F 9/451 715/201 |
| 2014/0258849 A1 * | 9/2014 | Chung | G06F 40/106 715/243 |

(Continued)

*Primary Examiner* — Ryan F Pitaro
(74) *Attorney, Agent, or Firm* — Muirhead and Saturnelli, LLC

(57) ABSTRACT

Techniques for rendering a user interface may include: receiving a view area height and width, a first integer denoting a count of objects to be displayed, a minimum row height, and a minimum object width; determining a maximum allowed number of columns in accordance with the view area width and minimum object width; determining a current number of rows in accordance with the view area height, a current number of columns, the minimum row height, and the first integer; determining whether the current number of rows and columns denote an optimized layout of the objects, wherein the optimized layout is in accordance with a plurality of conditions; and responsive to determining the current number of rows and columns denote an optimized layout, rendering the plurality of objects in a view area in accordance with the current number of rows and columns.

19 Claims, 18 Drawing Sheets

(56) References Cited

U.S. PATENT DOCUMENTS

| | | | |
|---|---|---|---|
| 2016/0026356 A1* | 1/2016 | Persaud | G06F 3/0485 |
| | | | 715/212 |
| 2019/0130873 A1* | 5/2019 | Shaw | G06F 40/189 |
| 2020/0057823 A1* | 2/2020 | McCarty | G06F 3/0237 |
| 2023/0025614 A1* | 1/2023 | Fitzgerald | G06T 11/206 |

* cited by examiner

```
private optimizeDashboardLayout = (containerHeight : number, containerWidth: number,
                                    numberOfVisibleCharts: number) =>                    ⎫
                                                                                         ⎬ 1002
                                                                                         ⎭ let numberOfColumns:number = 1;                    ⎫
let numberOfRows:number = 1;                       ⎬ 1004
let layoutOptimized: boolean = false;              ⎭ let minimumRowHeight :number = 225;
let minimumChartWidth :number = 250;

let maxAllowedNumberOfColumns = Math.round(containerWidth / minimumChartWidth);  // ←── 1006 while(!layoutOptimized && numberOfColumns <= maxAllowedNumberOfColumns) {  ←── 1008a this.optimizeRowsAndColumns (containerHeight, numberOfColumns, numberOfRows,     ⎫
                              minimumRowHeight, layoutOptimized ,numberOfVisibleCharts); ⎬ 1008b
                                                                                         ⎭ if(!layoutOptimized) {              ⎫
    numberOfColumns ++;             ⎬ 1008c
}                                   ⎭

```
private optimizeRowsAndColumns = (containerHeight: number, numberOfColumns: number,
    numberOfRows: number, minimumRowHeight: number, layoutOptimized:boolean,
    numberOfVisibleCharts: number) => {                                              ⎫
                                                                                     ⎬ 1102
                                                                                     ⎭
                                                                                     → 1104
  do {
    let numberOfChartsVisibleWithoutScrolling : number = numberOfColumns * numberOfRows;
    this.numberOfColumns = numberOfColumns;    ⎫
    this.numberOfRows = numberOfRows;          ⎬ 1106
                                               ⎭
    if(numberOfVisibleCharts <= numberOfChartsVisibleWithoutScrolling){
      layoutOptimized = true;
      break;
    }
    numberOfRows++;   → 1110
  } while (containerHeight/numberOfRows >= minimumRowHeight);  → 1112
  return layoutOptimized;  → 1114
}
```

```
public isChartInLastRow = (chartIndex) :boolean=> {   ←—— 1202 let numberOfRows :number = Math.ceil (numberOfVisibleCharts / .numberOfColumns);   ←—— 1204
    let lastChartIndex = (numberOfColumns * numberOfRows) -1;   ←—— 1206
    let chartInLastRow :boolean = chartIndex > (lastChartIndex - this.numberOfColumns);   ←—— 1208
    return chartInLastRow;   ←—— 1210
};
```

```
private setLastChartWidth = 0 => {                    ← 1302
  let modulusOfVisibleChartsToNumberOfColumns :number = numberOfVisibleCharts MOD numberOfColumns;    ← 1304
  if(modulusOfVisibleChartsToNumberOfColumns >= 1){
    lastRowChartWidth = (containerWidth/numberOfChartsOnLastRow);
  }
  else {
    lastRowChartWidth = this.chartWidth;
  }
}
```

1306 — if block
1308 — else block
1300 — overall

FIG. 5D

… # TECHNIQUES FOR USER INTERFACE LAYOUTS

BACKGROUND

Technical Field

This application generally relates to user interfaces.

Description of Related Art

A user may utilize a user interface (UI) to interact with a software application executing on a system. There are multiple types of UIs and the application may support one or more of the UI types or interfaces. Common interfaces may include a command line interface (CLI), an application programming interface (API), and a graphical user interface (GUI). With the GUI, users interact with the application by manipulating visual widgets, UI elements or controls to perform requested operations or tasks. The UI elements or controls may include, for example, buttons, scroll bars, and menus. In response to user interactions using the GUI, such as by selecting different UI elements or controls, requested information may be displayed on a device screen or monitor. The requested information may be displayed to the user in any suitable structure or organization. For example, requested information may be displayed in the GUI in the form of a list, a table including multiple rows and columns, a graph, and other suitable organizations or structures. The information displayed may be in a view area in which the multiple structures are presented in a layout. The layout may be a particular arrangement in which the multiple structures are presented in the GUI. For example, multiple tables may be displayed in a GUI in a layout including multiple rows and multiple columns. Thus, to display the multiple tables, processing may be performed by the application or code of its GUI to determine the particular layout used for the multiple tables. Determining the layout may include determining sizes of the tables rendered, determining the number of rows and columns of the layout, and determining the number of tables to include in a single view area. In some instances, not all of the multiple tables of the layout may be rendered in a single view area. In this case, a portion of the multiple tables may be rendered in the single view area with a remaining portion of the tables not visible and accessible via scrolling, such as using a scroll bar.

SUMMARY OF THE INVENTION

Embodiments of the techniques herein include a method, computer readable medium and system for rendering a user interface (UI) comprising: receiving a plurality of inputs including a view area height, a view area width, a first integer denoting a count of a plurality of objects to be displayed, a minimum row height denoting a minimum object height, and a minimum object width, wherein a view area in which the plurality of objects is to be displayed has a height denoted by the view area height and a width denoted by the view area width; determining a maximum allowed number of columns in accordance with the view area width and minimum object width; determining a current number of rows in accordance with the view area height, a current number of columns, the minimum row height, and the first integer denoting a count of a plurality of objects to be displayed; determining whether the current number of rows and the current number of columns denote an optimized layout of the plurality of objects, wherein the optimized layout is in accordance with a plurality of conditions; and responsive to determining the current number of rows and the current number of columns denote an optimized layout, rendering the plurality of objects in the view area in accordance with the current number of rows and the current number of columns.

In at least one embodiment, responsive to determining the current number of rows and the current number of columns do not denote an optimized layout, first processing may be performed that includes: incrementing the current number of columns by one (1); determining whether the current number of columns is less than or equal to the maximum allowed number of columns; responsive to determining the current number of columns is less than or equal to the maximum allowed number of columns, determining an updated value for the current number of rows in accordance with the view area height, the current number of columns, the minimum row height, and the first integer denoting a count of a plurality of objects to be displayed; and responsive to determining the current number of columns is not less than or equal to the maximum allowed number of columns, determining that there is no optimized layout that meets the plurality of conditions, wherein the plurality of conditions includes a first condition that the number of objects be included in a layout in the view area without scrolling, a second condition that a number of columns of a layout not exceed the maximum allowed number of columns, and a third condition that each displayed object of the view area in accordance with a layout have an associated width dimension that is not less than the minimum object width and an associated height dimension that is not less than the minimum row height denoting the minimum object height.

In at least one embodiment, determining the current number of rows in accordance with the view area height, the current number of columns, the minimum row height, and the first integer denoting a count of a plurality of objects to be displayed may further include: determining a first amount denoting a number of objects visible in a single view without scrolling, wherein the first amount is a mathematical product of a current number of rows and a current number of columns; determining whether the first integer is less than or equal to the first amount; and responsive to determining the first integer is less than or equal to the first amount, determining the current number of columns and the current number of rows denote an optimized layout. Responsive to determining the first integer is not less than or equal to the first amount, first processing may be performed that includes: incrementing the current number of rows by one (1); and determining whether a current row height is greater than or equal to the minimum row height, wherein the current row height is the view area height divided by the current number of rows. The first processing may further include: responsive to determining the current row height is greater than or equal to the minimum row height, performing second processing. The second processing may comprise: assigning the first amount, that denotes the number of objects visible without scrolling, an updated value that is a mathematical product of the current number of rows and the current number of columns; determining whether the first integer is less than or equal to the first amount; and responsive to determining the first integer is less than or equal to the first amount, determining that the current number of columns and the current number of rows denote an optimized layout. The first processing may further comprise: responsive to determining the current row height is not greater than or equal to the minimum row height, performing third processing. The third processing may include: determining the current number of columns and the current number of rows do not denote an optimized layout; incrementing the current number of columns by one (1); determining whether the current number of columns is less than or equal to the maximum allowed number of columns; responsive to determining the current number of columns is less than or equal to the maximum allowed number of columns, determining an updated value for the current number of rows in accordance with the view area height, the current number of columns, the minimum row height, and the first integer denoting a count of a plurality of objects to be displayed; and responsive to determining the current number of columns is not less than or equal to the maximum allowed number of columns, determining that there is no optimized layout that meets the plurality of conditions, wherein the plurality of conditions includes a first condition that the number of objects be included in a layout in the view area, a second condition that a number of columns of a layout not exceed the maximum allowed number of columns, and a third condition that each displayed object have dimension that are not less than the minimum object width and the minimum row height denoting the minimum object height.

In at least one embodiment, the plurality of objects may be rendered in the view area in a layout with the current number of rows and the current number of columns, and wherein the current number of rows is greater than 1 and wherein the current number of columns is greater than 1. Processing may include: responsive to determining a last row of the current number of rows rendered includes more than 1 object, determining a second object width in accordance with dividing the view area width by a number of objects in the last row; and rendering each object of the last row to have a width equal to the second object width. Responsive to determining the last row includes a single object, the single object of the last row may be rendered to have a width equal to the view area width.

In at least one embodiment, the minimum row height may denote a first number of pixels, the minimum object width may denote a second number of pixels, the view area height may denote a third number of pixels, and the view area width may denote a fourth number of pixels. The plurality of objects may include a plurality of charts. The plurality of objects may include a plurality of tables. Processing to render the UI may be performed in response to an occurrence of a trigger condition. The trigger condition may be a UI interaction that results in resizing the view area. The trigger condition may include adding one or more objects to the view area. The trigger condition may include removing one or more objects from the view area.

In at least one embodiment, responsive to determining that there is no optimized layout that meets the plurality of conditions, processing may include displaying a first portion of the plurality of objects in the view area with a remaining portion of the plurality of objects not visible in the view area. The remaining portion of the plurality of objects may be available for viewing in the view area by scrolling.

BRIEF DESCRIPTION OF THE DRAWINGS

Features and advantages of the techniques herein will become more apparent from the following detailed description of exemplary embodiments thereof taken in conjunction with the accompanying drawings in which:

FIGS. 5A, 5B, 5C and 5D are examples describing processing that may be performed in an embodiment in accordance with the techniques herein.

DETAILED DESCRIPTION OF
EMBODIMENT(S)

Figure 1:
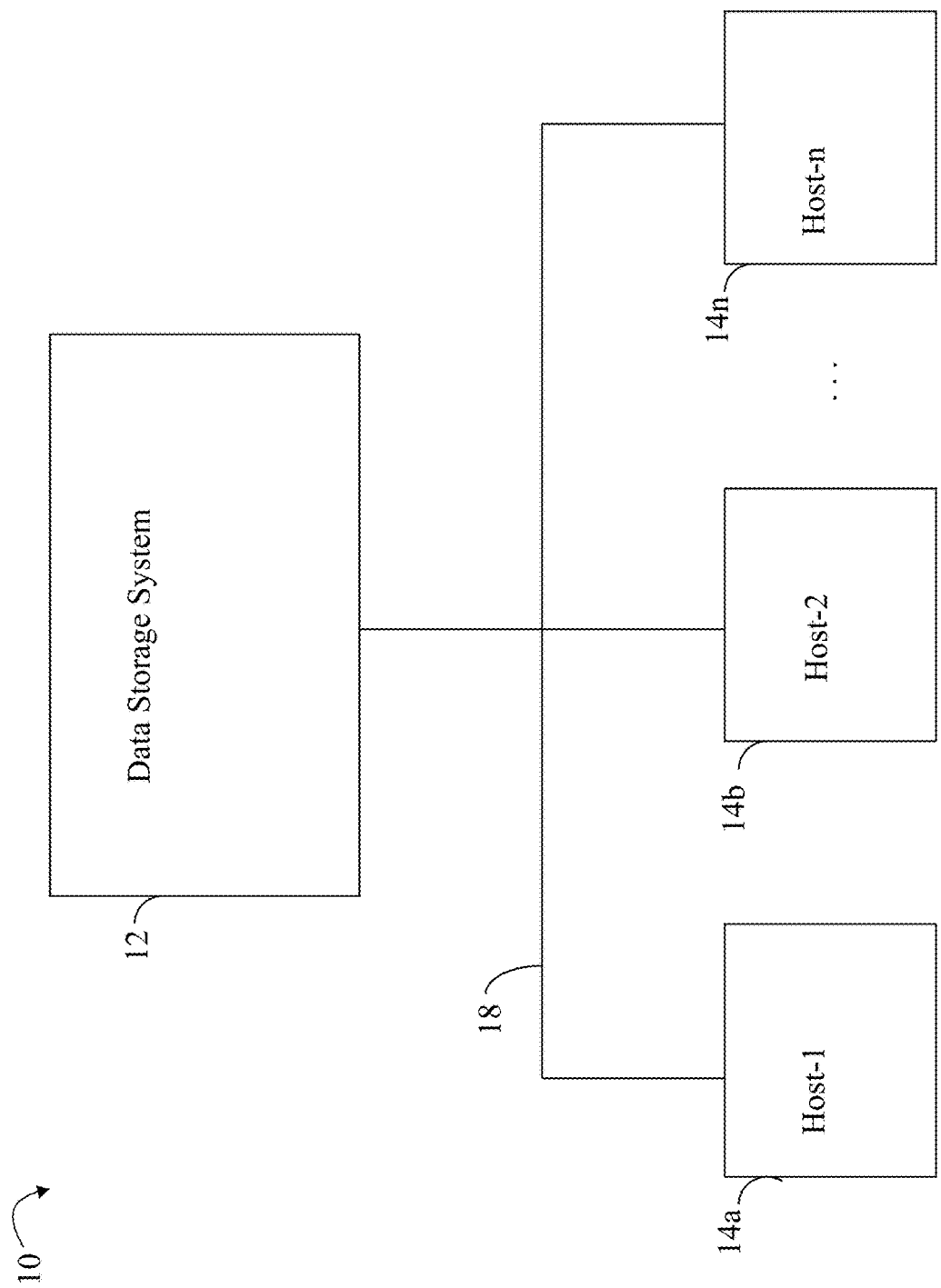
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
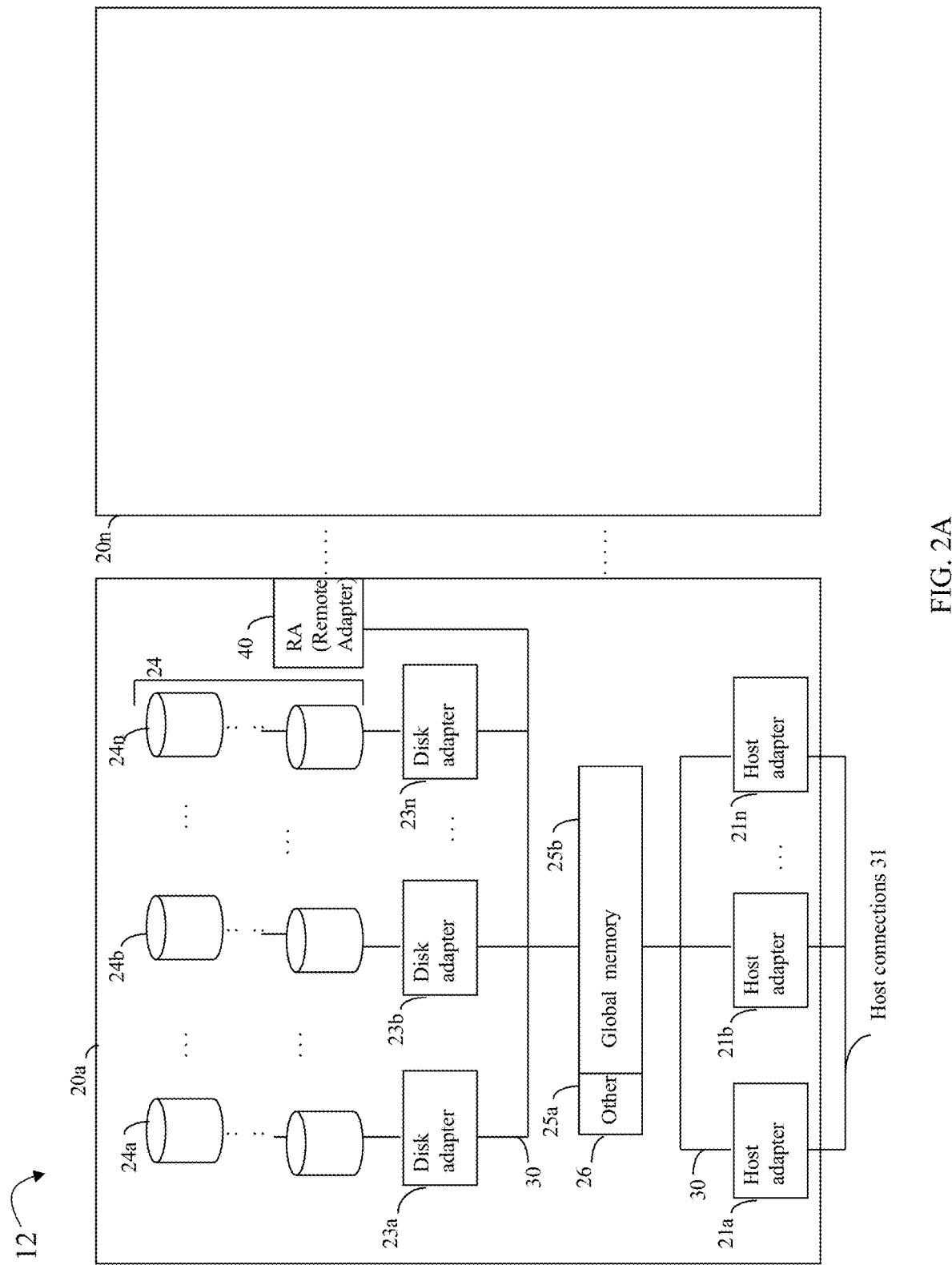
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., 15K RPM drives, 10K RPM drives), one or more types of flash-based storage devices, or more generally solid state drives (SSDs), such as SSDs that communicate using the NVMe protocol, and the like.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25*b*) and marked as write pending. Once written to the cache, the host may be notified that the write operation has completed. At a later point time, the write data may be destaged from the cache to the physical storage device, such as the non-volatile physical storage device (PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIG. 2A is merely illustrative of one such architecture that may be used in connection with the techniques herein. Those skilled in the art will appreciate that the techniques herein may be used with any suitable data storage system.

In an embodiment of a data storage system in accordance with the techniques herein, the components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In connection with a data storage system management application, or more generally any application having a user interface (UI) such as a GUI, information may be displayed to a user. For example, in at least one data storage system management application with a GUI, the GUI may be populated with charts or tables rendered in a view to display requested information regarding aspects of the data storage system I/O performance, resource utilization or consumption, or other information generally about physical and/or logical storage entities or objects (e.g., information including metrics about LUNs, logically defined groups of LUNs, caching, host I/Os, backend I/Os), and the like. In at least one embodiment described herein for purposes of illustration, a view rendered in the UI may include one or more objects, where the objects are charts or tables. A chart may generally refer to a graphical display of information. In at least one embodiment, each chart may have an associated chart type that is a selected one of multiple predefined chart types. Visual aspects regarding how information of the chart is displayed may vary with the particular chart type. For example, the predefined chart types may include a line chart, bar chart, pie chart, and the like. The particular predefined chart types may vary with embodiment.

One task performed in connection with the GUI includes rendering charts, tables, or more generally other objects, within a dashboard, screen or view area. To render the objects such as charts or tables in the view area, processing may be performed to determine a layout for the particular number of charts or tables as well as other UI objects or elements that may be displayed.

In at least one existing GUI, the charts or tables displayed within a view area or dashboard may all have the same width and height, and may be included in a layout having a pre-selected or pre-determined number of rows and columns. Typically one of the following two scenarios may result. In a first scenario, the charts or tables of the layout may overfill the view area such that not all the charts or tables are visible in the view area. A user may have to scroll, such as using a scroll bar associated with the view area, to see charts, tables or other objects or structures that are not currently displayed in the view area. Thus with the first scenario all objects or structures to be displayed are not visible within a single view area. In a second scenario, the layout may not optimally use space in the view area or dashboard. For example, the layout may result in a rendered display with unused space of the view area. The tables or charts displayed may all have the same dimensions so that the last row of the displayed charts may not fill the width available. Additionally, in cases where all objects are presented in a single view area, the size of the rendered objects may be very small and considered unreadable and/or unusable.

To overcome the foregoing drawbacks, various aspects of the layout and/or rendered objects may be modified to make better use of the screen space for the number of objects rendered in a single view of the GUI.

Described in the following paragraphs are techniques that calculate a suitable and appropriate number of rows and columns that may be used to optimally display for viewing a specified number of objects in a single view area or dashboard without scrolling. In at least one embodiment, the techniques herein also take into account the screen resolution that can vary with the particular display device, currently selected size of the view area, and the like. In at least one embodiment, the techniques herein may include automatically determining dimensions of the individual objects, such as charts or table, to be displayed in a single view area such that each individual object has associated dimensions that meet a specified minimum width and minimum height to facilitate a user viewing the individual object on the display. In at least one embodiment, the minimum height and minimum width may denote boundary conditions of minimum object dimensions to ensure minimum size requirements or conditions affecting viewing ability of the rendered object. In at least one embodiment, the boundary conditions may be specified as minimum numbers of pixels.

In at least one embodiment in accordance with the techniques herein, the algorithms described herein may be used to optimize the sizes selected for dimensions of the objects rendered within a GUI view area or dashboard to ensure all available space is used in an optimal manner. In at least one embodiment, the algorithms provide for dynamically sizing the objects to be displayed in the single view area or dashboard. The horizontal and vertical pixel dimensions of the view area or dashboard may be provided. Subsequently, an optimal number of rows and an optimal number of columns may be determined based on boundary conditions defining minimum dimensions of each object to be displayed to ensure a minimum viewing and usability standard. Based on the boundary conditions, the techniques may determine, where possible, the number of rows and columns in order to fit a specified number of objects within a single view without scrolling. Additionally, objects in the last row may be sized to accordingly fill the available width of the last row and minimize unused white space of the last row.

In at least one embodiment, the techniques herein may be used to determine an optimal layout, where possible, that includes a number of rows and columns for a specified number of objects displayed in a single view area without scrolling where the optimal layout meets a plurality of conditions. The plurality of conditions may include a first condition that the specified number of objects be included in the optimal layout in the view area without scrolling, a second condition that a number of columns of the optimal layout not exceed a maximum allowed number of columns, and a third condition that each displayed object of the view area in accordance with the optimal layout have an associated width dimension that is not less than the minimum object width and an associated height dimension that is not less than the minimum row height denoting the minimum object height.

In at least one embodiment, the techniques herein may be used to determine that no optimal layout with a number of rows and columns exists for a specified number of objects displayed in a single view area without scrolling, where the optimal layout meets a plurality of conditions. The plurality of conditions may include a first condition that the specified number of objects be included in the optimal layout in the view area without scrolling, a second condition that a number of columns of the optimal layout not exceed a maximum allowed number of columns, and a third condition that each displayed object of the view area in accordance with the optimal layout have an associated width dimension that is not less than the minimum object width and an associated height dimension that is not less than the minimum row height denoting the minimum object height. In response to determining no such optimal layout exists that includes all the specified objects in a single view meeting the plurality of conditions, an action may be taken in order to determine an optimal layout using the techniques herein. For example, the specified number of objects to be included in the single display without scrolling may be reduced where, as a result, the techniques herein may be used to then determine an optimal layout for the remaining objects. As another example, the minimal boundary conditions or sizes of the third condition may be reduced where, as a result, the techniques herein may then be able to determine an optimal layout for the objects meeting the revised boundary conditions. As another example, the size of the view area may be increased or expanded where possible such as by expanding the size of a browser window or view area of the application. As a result, the techniques herein may then be used to determine an optimal layout for the objects using the enlarged view area. As another example, the objects may be displayed on another device or monitor having an increased resolution so that the view area includes additional pixels. As a result, the techniques herein may then be used to determine an optimal layout for the objects using a view area with a larger number of pixels.

In response to determining no such optimal layout exists that includes all the specified objects in a single view meeting the plurality of conditions, it may be determined that the specified number of objects cannot be rendered in a single view area while also meeting the specified minimum boundary conditions of the third condition noted above and also meeting the second condition noted above to not exceed a maximum allowable number of columns. Thus in at least one embodiment in response to determining no such optimal layout exists meeting the foregoing plurality of conditions, another action that may be taken includes accordingly displaying a first portion of less than all the specified number of objects in a single view area with a remaining portion of the specified number of objects not visible in the same single view area. The remaining portion of the specified objects are available for viewing in the view area by scrolling such as with a scroll bar.

In at least one embodiment, the horizontal and vertical pixel dimensions of the dashboard or view area may be determined automatically and dynamically in accordance with the current size of the view area. Accordingly, the techniques herein may be used to customize the layout of the objects and size of the objects in the view area or dashboard in accordance with the pixel dimensions of the view area. The size of the view area, and thus the number of pixels in the view area, may change in response to an event, for example, such as in response to a user resizing the view area of the GUI, an object being added to the view area, an object being removed from the view area, and the like. Thus, one or more trigger events, such any of the foregoing events, may trigger performing the techniques herein to display or resize and then redisplay the objects in the current dashboard or view area.

In at least one embodiment, the size of the view area, and thus the number of pixels in the view area, may vary depending on the particular resolution of the monitor or other display device upon which the objects of the view area are rendered. For example, different monitors or display devices may include a full HD (high definition) monitor, an UW (ultrawide) monitor, and a 4K monitor. The foregoing monitors or display devices have different screen resolutions or dimensions. For example, the full HD monitor has 1920 pixels horizontally across the screen and 1080 pixels vertically, or 1920×1080; the UW monitor has 3440 pixels horizontally across the screen and 1440 pixels vertically, or 13440×1440; and the 4K monitor has 3840 pixels horizontally across the screen and 2160 pixels vertically, or 3840×2160.

In at least one embodiment in accordance with the techniques herein, the view area or dashboard may be the entire monitor screen. In this case, the techniques herein provide for customizing the size of the view area in accordance with the pixel dimensions of the particular monitor. Additionally and more generally, a view area or dashboard may have physical dimensions of height and width such as, for example, in inches or centimeters based on the amount of screen space utilized. In this case, the techniques herein provide for dynamically determining the size of the view area in terms of pixels in accordance with the particular resolution of the monitor or display device including the view area or dashboard. Thus, the view area may be a particular size in terms of physical dimensions of screen space which is further determined to have associated pixel dimensions in accordance with the particular resolution of the monitor or display device on which the objects of the view area are rendered. In at least one embodiment, the techniques herein provide for utilizing dimensions of the view area expressed in terms of pixels to account for the varied resolution that may be provided by the particular monitor upon which the objects of the view area are rendered.

The foregoing and other aspects of the techniques herein are described in more detail in the following paragraphs.

Described in the following paragraphs is a first technique that may be used to determine, when possible, an optimal or optimized layout for a specified number of objects to be rendered in a GUI. The optimal or optimized layout meets a plurality of conditions. The plurality of conditions may include a first condition that the specified number of objects be included in the optimal layout in a single view area without scrolling, a second condition that a number of columns of the optimal layout not exceed a maximum allowed number of columns, and a third condition that each displayed object of the view area in accordance with the optimal layout have an associated width dimension that is not less than the minimum object width and an associated height dimension that is not less than the minimum row height denoting the minimum object height.

Also described in the following paragraphs is a second technique that may be used to generally determine sizes of objects in a single row of the layout, where such sizes are determined with a goal of filling the available width of the layout. In at least one embodiment, the second technique may be used in combination with the first technique. For example, the second technique may be used in connection with the last or bottom row of a layout to maximize use of all available space across the last or bottom row. It will be appreciated by those skilled in the art that the second technique may be used independently of the first technique, and that the first technique may be used independently of the second technique. Additionally, the second technique may be more generally used in connection with determining sizes of objects in any row of the layout and is not so limited to use in connection with only the last or bottom row of the layout.

In at least one embodiment, the first technique may be used to determine an optimized or optimal layout of a number of rows and columns used to display all desired objects in a single view area without scrolling, where the number of columns does not exceed a specified maximum, and where each rendered object meets minimum boundary conditions or sizes, such as minimum dimensions expressed in numbers of pixels. In such an embodiment, the second technique may then be applied to the last row of objects of the layout to determine dimensions of the objects with the goal of minimizing the amount of unused space of the last row. Consistent with other discussion herein, there may not be an optimal layout that meets all specified conditions or criteria of an optimal or optimized layout. In this case in at least one embodiment, processing may display or render as many objects as possible in a single view area with remaining objects not visible in the single view area but available via scrolling of the view area. All the objects rendered in the single view area may not include all desired objects, the layout may meet the minimum boundary conditions and may meet the maximum number of columns condition.

What will now be described are flowcharts of processing that may be performed in at least one embodiment to implement the first technique to determine an optimal or optimized layout, where possible, for a number of specified objects meeting the plurality of conditions including the three conditions discussed in more detail elsewhere herein.

Figure 2C:
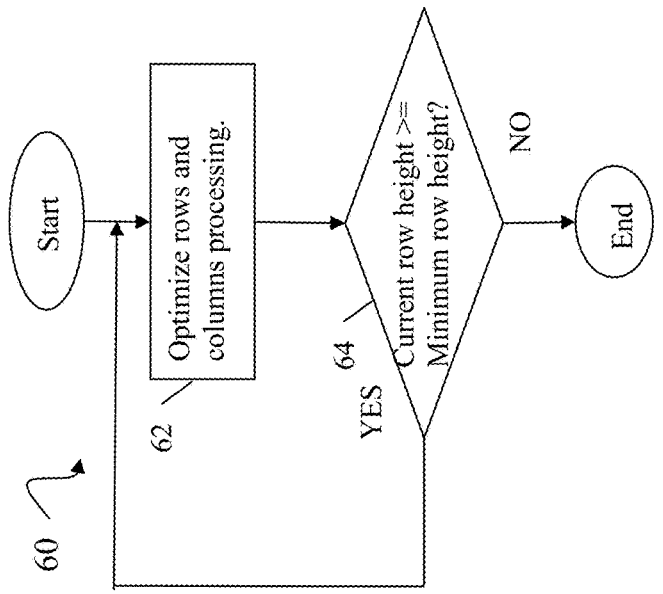
FIGS. 2B, 2C, 3A, 3B, and 4 are flowcharts of processing steps that may be performed in an embodiment in accordance with the techniques herein.
Figure 2B:
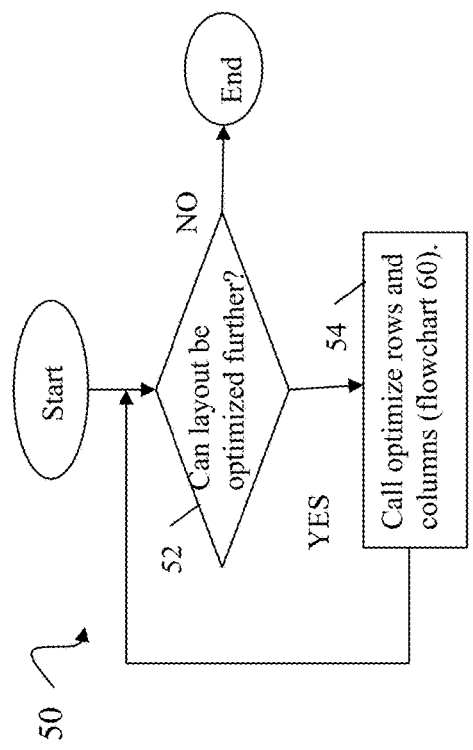

Referring to FIG. 2B, shown is a first flowchart of processing steps that may be performed in an embodiment in accordance with the techniques herein. The flowchart 50 provides a high level view of processing of a main control loop that begins with the step 52.

At the step 52, a determination is made as to whether the current layout including a current number of rows and a current number of columns can be further optimized. If the step 52 evaluates to no, processing stops. Otherwise, if the step 52 evaluates to yes, control proceeds to the step 54.

At the step 54, processing is performed to call or invoke optimize rows and columns processing as generally illustrated in the flowchart 60 of FIG. 2C. Once the processing of the flowchart 60 has completed, control then proceeds from the step 54 to the step 52.

Referring to FIG. 2C, shown is a second flowchart 60 of processing steps that may be performed in an embodiment in accordance with the techniques herein. As noted above, the flowchart 60 processing may be invoked in the step 54 of FIG. 2B. Thus, FIG. 2C provides further detail regarding the step 54.

At the step 62, processing is performed to optimize the rows and columns. From the step 62, control proceeds to the step 64. At the step 64, a determination is made as to whether a current row height for the layout is greater than or equal to a minimum row height. If the step 64 evaluates to no, processing of the flowchart 60 stops. Otherwise if the step 64 evaluates to yes, processing proceeds from the step 64 to the step 62.

Additional detail regarding the high level processing denoted by the flowcharts 2B and 2C is provided in the following paragraphs.

Figure 3A:
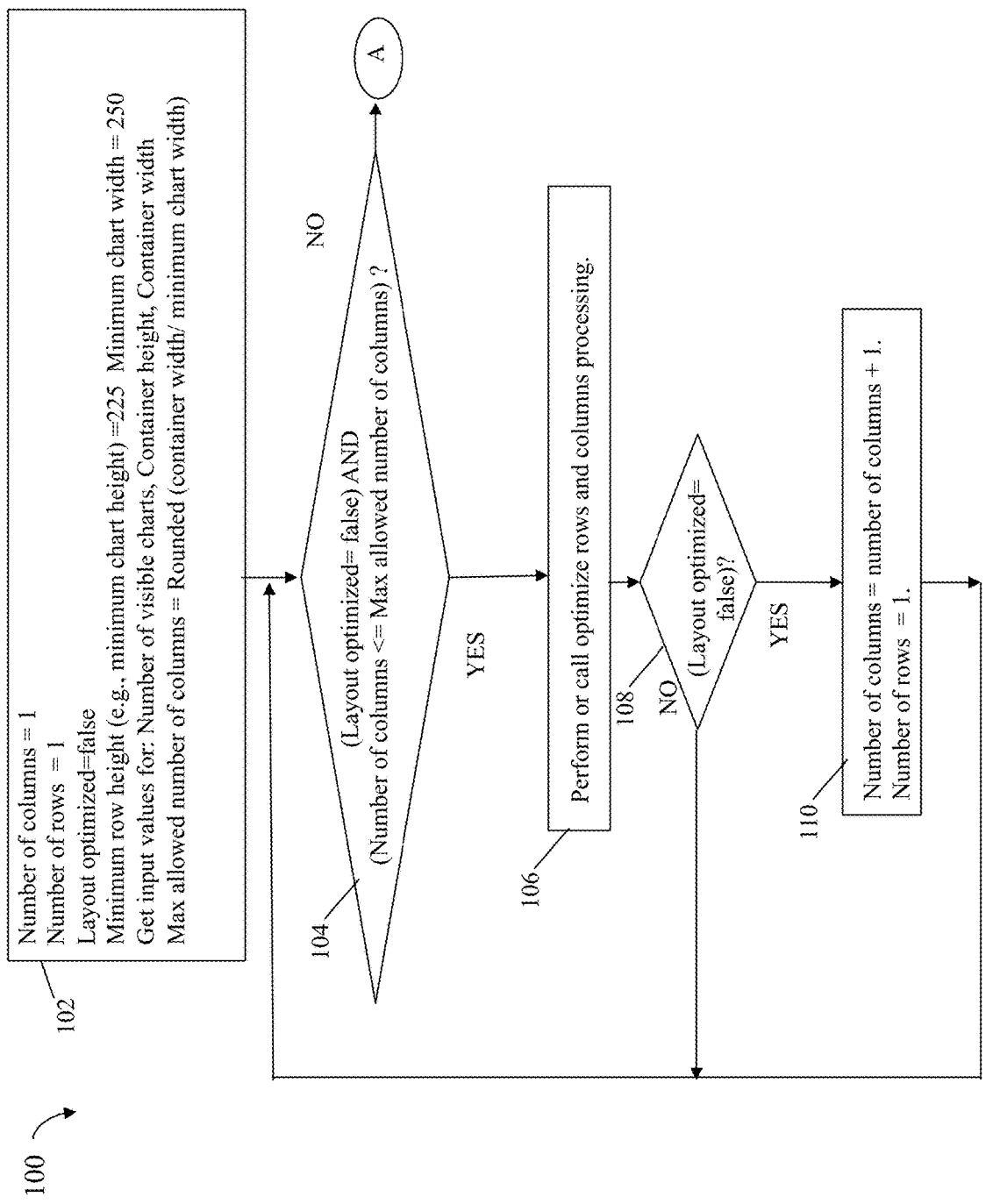
Figure 3B:
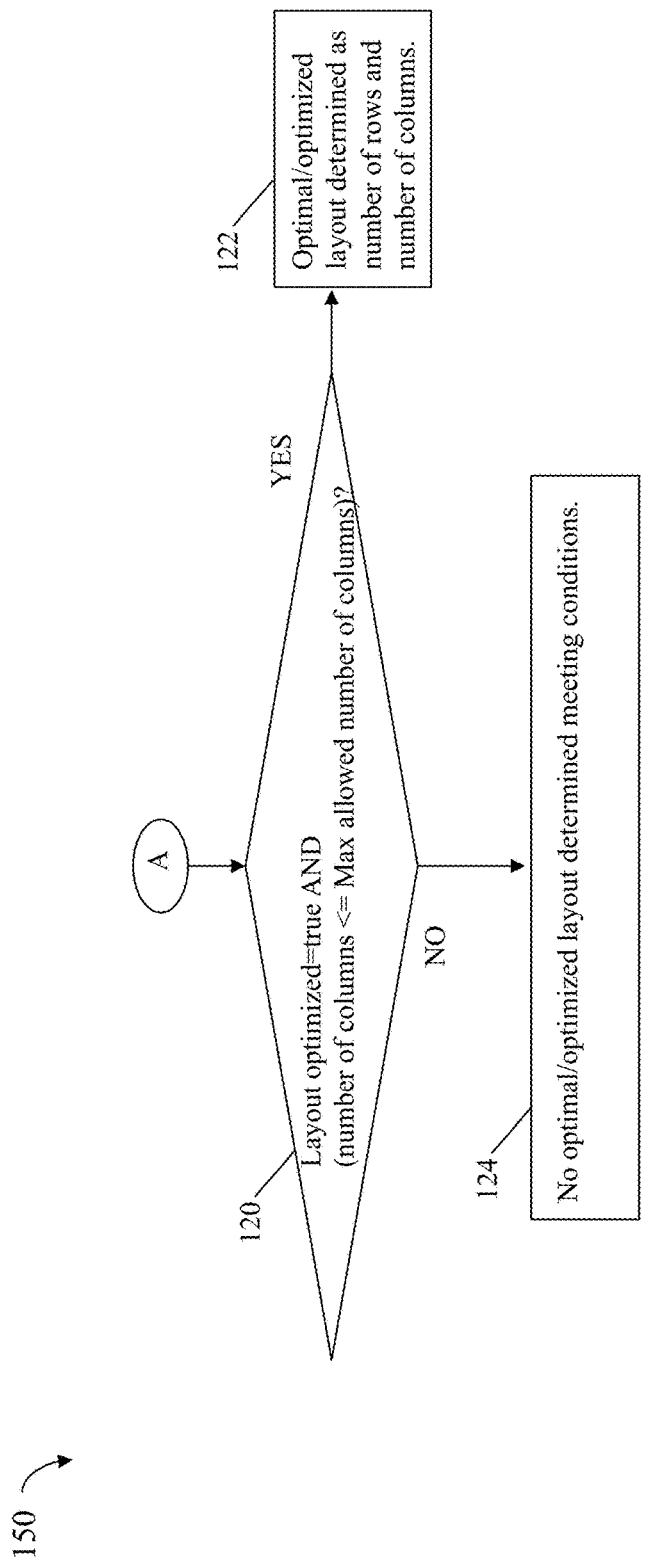

Referring to FIGS. 3A and 3B, shown is a third flowchart 100, 150 of processing steps that may be performed in an embodiment in accordance with the techniques herein. FIGS. 3A and 3B provide further detail of processing as described in connection with the flowchart of FIG. 2B.

At the step 102, inputs are obtained and variables are initialized for use in subsequent processing. The step 102 may include initializing the number of columns=1 and the number of rows=1. The number of columns and the number of rows are variables that denote the current column and row dimensions of the layout being determined. The step 102 may include initializing a Boolean variable layout optimized to false. The variable layout optimized indicates whether the current number of columns and rows (denoted by the variables the number of columns and the number of rows) is deemed an optimal or optimized layout meeting the 3 specified conditions or criteria described in more detail elsewhere herein. Layout optimized is true if the current number of columns and rows denote an optimized or optimal layout for a specified number of objects; otherwise layout optimized is false.

The step 102 may include initializing each of the minimum row height and the minimum chart width to a number of pixels. The minimum row height and the minimum chart width denote the boundary conditions or minimum pixel dimensions for each chart, or more generally each object or structure, included in the layout. The minimum row height and the minimum chart may generally be any suitable values. For example, in at least one embodiment, the minimum row height may be set to 225 pixels, and the minimum chart width may be set to 250 pixels. The minimum row height also denotes the minimum chart height or height dimension of each object of the layout.

The step 102 may include obtaining input values for a number of visible charts, a container height, and a container width. The number of visible charts may denote the number of charts, or more generally objects, to be included in the view area for which an optimal or optimized layout is being determined. The container height and the container width may denote, respectively, the height and width dimensions of the view area or dashboard in which the number of visible charts is to be rendered in accordance with a layout. The container height and the container width may each be expressed in a number of pixels.

In at least one embodiment, the container height and the container width may be determined in accordance with the physical dimensions of the view area and the current monitor or display device resolution. For example, if the view area is the entire screen or monitor display, then the height and width dimensions of the view area may be the pixel dimensions of the entire screen. As a variation, if the view area is ½ the width and ½ the height of the screen or monitor display, then the view area may have a height dimension in pixels that is ½ the height of the screen or monitor display, and the view area may have a width dimension in pixels that is ½ the width of the screen or monitor display. Thus generally it is straight forward to determine the height and width dimensions for the view area in a number of pixels based on the particular resolution of the monitor or screen used to render the objects of the view area.

The step 102 may include determining a maximum (max) allowed number of columns in accordance with the container width and the container height. The max allowed number of columns may denote the maximum number of columns allowed in an optimized or optimal layout. In at least one embodiment, the max allowed number of columns may be determined by dividing the container width by the minimum chart width, and then further rounding the result of the foregoing division. In at least one embodiment, such rounding may round any decimal value up to the next highest integer value. From the step 102, control proceeds to the step 104.

At the step 104, a determination is made as to whether layout optimized is false and the number of columns is less than or equal to the max allowed number of columns. If the step 104 evaluates to yes, control proceeds to the step 106.

Figure 4:
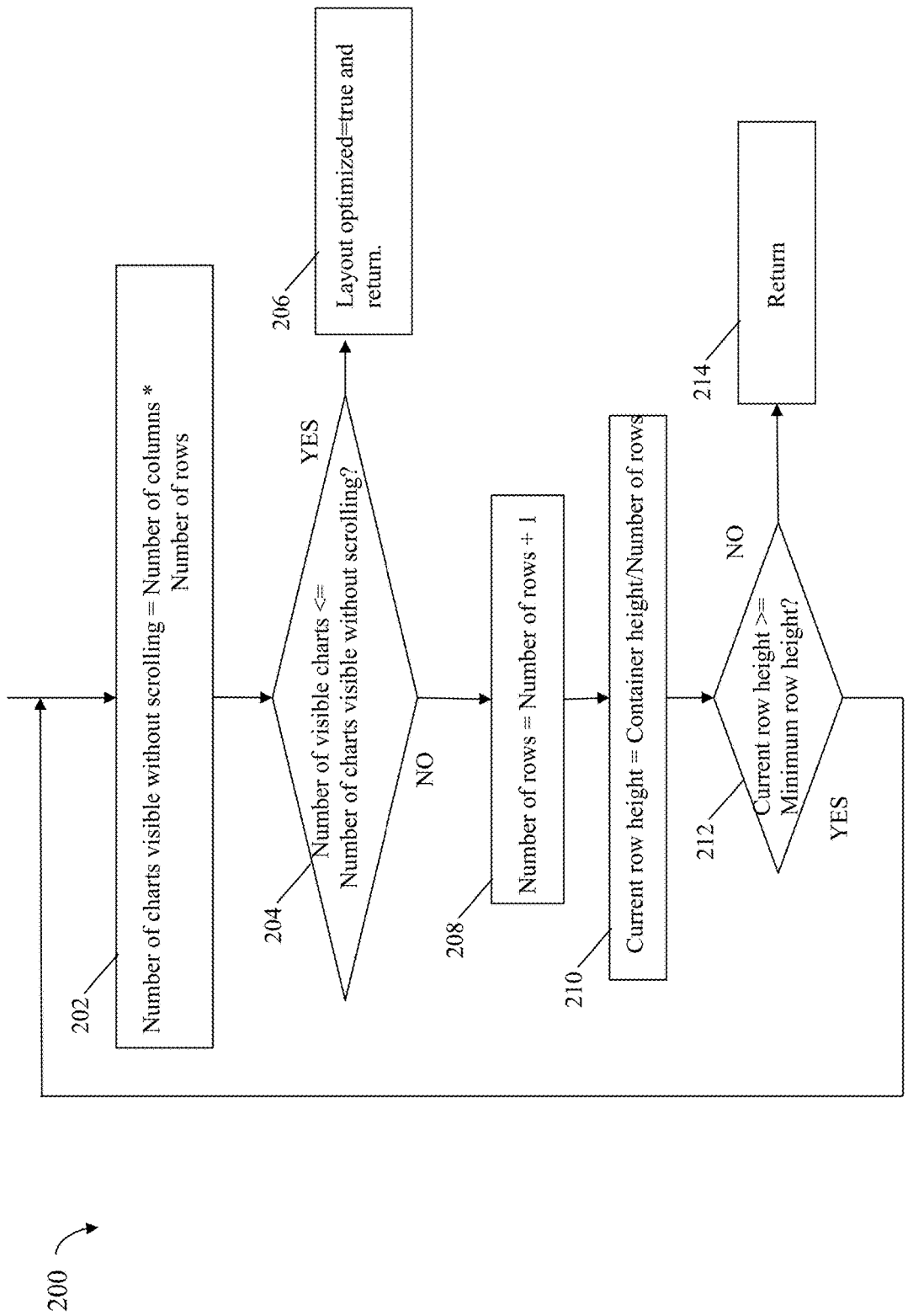

At the step 106, optimize rows and columns processing is performed such as described in more detail in FIG. 4 with the flowchart 200 processing. Thus, the step 106 may result in the transfer of control to perform the processing of FIG. 4 described below. Once the step 106 processing has completed, control proceeds from the step 106 to the step 108. At the step 108, a determination is made as to whether layout optimized is false. If the step 108 evaluates to yes, control proceeds to the step 110.

At the step 110, the number of columns is incremented by 1; and the number of rows may be reinitialized to 1. From the step 110, control proceeds to the step 104. If the step 108 evaluates to no, control proceeds to the step 104.

If the step 104 evaluates to no, control proceeds from the step 104 to the step 120. At the step 120, a determination is made as to whether layout optimized is true and the number of columns is less than or equal to the max allowed number of columns. If the step 120 evaluates to yes, control proceeds to the step 122.

At the step 122, an optimal or optimized layout is determined as the current values for the number of rows and the number of columns. If the step 120 evaluates to no, control proceeds to the step 124. In particular, at the step 124, the variable layout optimized is false and the number of columns is larger than the max allowed number of columns.

At the step 124, it may be determined that there is no optimal or optimized layout for the number of visible charts meeting the three specified conditions described herein. Additionally, the three specified conditions are expressed in processing of the flowcharts of FIGS. 3A, 3B and FIG. 4 below. As discussed in more detail elsewhere herein, the 3 conditions that must be met by a layout of a particular number of columns and rows to be deemed optimized or optimal includes a first condition that the specified number of objects be included in the optimal layout in the view area without scrolling. The first condition is reflected in processing of FIGS. 3A, 3B and FIG. 4 in which the layout determined includes the number of visible charts in the single view area having the dimensions denoted by the container width and the container height (e.g., the step 204 of FIG. 4). The second condition that a number of columns of the optimal layout not exceed a maximum allowed number of columns is reflected in the max allowed number of columns as determined in the step 102 and used in other processing steps such as the step 120 of FIG. 3B. The third condition, that each displayed object of the view area in accordance with the optimal layout have an associated width dimension that is not less than the minimum object width and an associated height dimension that is not less than the minimum row height denoting the minimum object height, is expressed in the boundary conditions of the minimum row height and the minimum chart width initialized in the step 102 and used in subsequent processing (e.g., the step 212 of FIG. 4).

In at least one embodiment, if processing reaches the step 124 it is determined that no optimal or optimized layout can be determined that meets the specified three conditions. In response, the current values for the number of rows and the number of columns may be used to determine the layout for the maximum number of objects displayed in a single view area with the remainder of the objects not visible in the single view area and accessible via scrolling. The content or selected objects included in the view area may be varied by scrolling, for example, to include at least some of the remaining objects in the view area.

Referring to FIG. 4, shown is a fourth flowchart 200 of processing steps that may be performed in an embodiment in accordance with the techniques herein. As noted above, the flowchart 200 processing may be invoked or performed in the step 106 of FIG. 3A. Thus, FIG. 4 provides further detail regarding processing of the step 106 of FIG. 3A in at least one embodiment. Generally, the flowchart 200 seeks to determine a number of rows given a number of columns. The number of columns variable may be increased or varied in FIG. 3A processing. For a particular number of columns, the processing of FIG. 4 varies the number of rows in an attempt to determine an optimized layout. FIG. 4 ends processing when either an optimized layout has been determined (e.g., the step 206) or when a determination is made that the boundary conditions cannot be met (e.g., the step 212 evaluates to no) by further increasing the number of rows. FIG. 4 processing may be characterized as determining a current number of rows in accordance with the view area height (e.g., container height), a current number of columns, the minimum row height, and the number of visible charts (e.g., that generally denotes the number of objects or charts to be displayed in view area).

At the step 202, a variable, the number of charts visible without scrolling, is determined as a mathematical product of the current number of rows and columns (e.g., the current values of the number of columns and the number of rows). The number of charts visible without scrolling generally denotes the number of charts or other objects that can fit in a single view area without scrolling. From the step 202, control proceeds to the step 204.

At the step 204, a determination is made as to whether the number of visible charts is less than or equal to the number of charts visible without scrolling. If the step 204 evaluates to yes, then control proceeds to the step 206. At the step 206, layout optimized is set to true and control may be returned, for example, to the step 106 of FIG. 3A to then proceed to the step 108 of FIG. 3A. If the step 204 evaluates to no, then control proceeds to the step 208.

At the step 208, the number of rows is incremented by 1 and control proceeds to the step 210. At the step 210, the current row height may be determined by dividing the container height by the number of rows (e.g., the variable denoting the current number of rows). From the step 210, control proceeds to the step 212.

At the step 212, a determination is made as to whether the current row height is greater than or equal to the minimum row height. If the step 212 evaluates to yes, control proceeds to the step 202. If the step 212 evaluates to no, control proceeds to the step 214. At the step 214, processing of the flowchart 200 stops and control may be returned, for example, to the step 106 of FIG. 3A to then proceed to the step 108 of FIG. 3A.

What will now be described in connection with FIGS. 5A and 5B are further details of processing that may be performed by the first technique using a pseudo-code like presentation.

Referring to FIG. 5A, shown is an example of a routine or function embodying processing as described in connection with FIG. 3A in at least one embodiment in accordance with the techniques herein.

The example 1000 includes the code portion 1002 denoting the parameters provided in connection with invoking the routine optimizeDashboardLayout. As denoted by 1002, the invocation or call may include the parameters container height, container width, and number of visible charts as described in connection with FIG. 3A.

The element 1004 denotes a portion of the variables initialized in the step 102 of FIG. 3A. The element 1006 denotes a line of code in which the variable, max allowed number of columns, is initialized as described in connection with the step 102 of FIG. 3A.

The element 1008 denotes a while loop embodying the processing such as described in connection with the steps 104, 106, 108 and 110 of FIG. 3A. In particular the element 1008a corresponds to the step 104 of FIG. 3A, the element 1008b corresponds to the step 106 of FIG. 3A, the element 1008c corresponds to the steps 108 and 110 of FIG. 3A.

Referring to FIG. 5B, shown is an example of a routine or function embodying processing as described in connection with FIG. 4 in at least one embodiment in accordance with the techniques herein.

The example 1100 includes the code portion 1102 denoting the parameters provided in connection with invoking the routine optimizeRowsAndColumns. As denoted by 1102, the invocation or call may include the parameters container height, number of columns, number of rows, minimum row height, layout optimized, and number of visible charts as described in connection with FIG. 3A. The example 1100 is the routine or function invoked in the line 1008a of FIG. 5A. The do while loop 1120 of the example 1100 embodies to overall logic of the outermost processing loop of FIG. 4.

The lines 1106 denote the assignment of the current values for the number of rows and the number columns for this particular invocation or call to the routine optimizeRowsAndColumns. The lines 1008 embody the logic of the steps 204 and 206 of FIG. 4. The line 1010 corresponds to the step 208 of FIG. 4. The condition denoted by the line 1112 corresponds to the condition of the steps 210 and 212 of FIG. 4. The line 1114 corresponds to the step 214 of FIG. 4.

What will now be described in more detail with reference to FIGS. 5C and 5D is the second technique noted above that may be used to generally determine sizes of objects in a single row of the layout, where such sizes are determined with a goal of filling the available width of the layout. In at least one embodiment, the second technique may be used in combination with the first technique described above. For example, the second technique may be used in connection with the last or bottom row of a layout determined as optimized or optimal in accordance with the first technique. In this particular embodiment, the second technique may be used to maximize filling all available space across the last or bottom row with objects.

In at least one embodiment, for each object of a layout within a dashboard, processing may be performed to determine whether the object, such as a chart, is positioned in the last, final or bottom row.

Referring to FIG. 5C, shown is a pseudo-code like description 1200 of processing that may be performed in at least one embodiment to determine whether a chart, or more generally an object, is included in the last, final or bottom row of a layout. In connection with the following description, a chart is referred to as the particular object type for illustration. Each chart of a layout may have an assigned chart index uniquely identifying the position of the chart in the layout. Additionally, the chart indices may be zero-based and assigned to positions in the layout by consecutively incrementing the chart index based on the position in the layout as the layout is traversed from left to right and from the top or first row to the bottom row. For example, reference is made to FIG. 8B discussed further below. The FIG. 8B includes a layout with 6 objects where the first row includes 4 objects and the second or bottom row includes 2 objects. In this case, the objects 552a-f may be respectively assigned chart indices from 0 through 5, inclusively.

The line 1202 indicates that the routine or function, isChartInLastRow, returns a boolan value and has input parameter chartIndex. Consistent with the discussion above, the input parameter chartIndex may be an integer value denoting the unique chart index of the particular chart or object in the layout for which the routine or function, isChartInLastRow, is performing processing to determine whether the particular chart or object is located in the last or bottom row of the layout. The routine or function, isChartInLastRow, returns a value of true if the chart or object identified by the input parameter value for chartIndex is in the last or bottom row, and otherwise returns false.

The line 1204 initializes the variable, numberOfRows, to an integer value that may be determined by dividing the numberOfVisibleCharts (e.g., number of visible charts as described in connection with the step 204 of FIG. 4) by the numberOfColumns denoting the number of columns in the layout. Additionally, the numberOfRows is an integer value that may be determined by applying a ceiling function (e.g. Math.ceil) that returns the smallest integer value that is greater than or equal to the specified decimal number. Thus, the line 1204 applies the ceiling function to the foregoing division operation result.

The line 1206 calculates the chart index (lastChartIndex) associated with the last positioned chart or object of the layout (e.g., the index of the chart or object located in right most column of the bottom row). Thus, the line 1206 calculates the lastChartIndex as (numberOfColumns*numberOfRows)−1.

The line 1208 is an expression that determines the Boolean value to be returned by the function isChartInLastRow. The line 1208 indicates that if the chartIndex associated with the particular chart for which processing is being performed is greater than lastCharIndex−numberOfColumns in the layout, then the Boolean variable chartInLastRow is associated true; and otherwise chartInLastRow is assigned false. In the line 1210, the function returns the Boolean value determined by the line 1208 for chartInLastRow.

To further illustrate, consider FIG. 8B again. If the input parameter chartIndex has a value of 4 or 5, then the function isChartInLastRow of FIG. 5C returns a value of true. If the input parameter chartIndex has a value of 0, 1, 2 or 3, then the function isChartInLastRow of FIG. 5C returns a value of false.

Thus, the function or routine of FIG. 5C may be called for each chart in a layout to determine whether the chart is located in the last or bottom row of a the layout.

If it is determined using the function of FIG. 5C that a chart is indeed located in the last or bottom row of the layout, the chart's width may then calculated as will now be described with reference to FIG. 5D.

With reference to FIG. 5D, shown is a pseudo-code like description 1300 of processing that may be performed in at least one embodiment to determine the width of a chart, or more generally an object, included in the last, final or bottom row of a layout. The processing of 1300 provides for maximizing the amount of space used in the last or bottom row by expanding the width of charts or objects of the last row, as needed, to fill the width of the last row of the layout.

The line 1304 calculates the number of charts located in the last or bottom row of the layout using the mathematical modulus % or MOD function, and assigns the result to the variable modulusOfVisibleChartsToNumberOfColumns. As known in the art, the MOD function performs a division operation of its two arguments and then returns the integer remainder as the result of the MOD function. For example with reference to FIG. 8B, the number of visible charts is 6 and the number of columns is 4 so that the number of charts in the last row determined by the code of the line 1304 is 2. Generally, the value of modulusOfVisibleChartsToNumberOfColumns being greater than or equal to 1 means that the one or more charts or objects of the last row need to have their width expanded or adjusted to fill available space in the last row with each chart of the last row having the same width. Alternatively, if the value of modulusOfVisibleChartsToNumberOfColumns is otherwise less than 1 (e.g., zero), then this means the number of columns on the last row is equal to the number of columns of all prior rows. In this latter case, the width of each chart or object of the last row is assigned the value of chartWidth denoting the current chart width of all other charts or objects of the layout. In the example of FIG. 5D, the value this.chartWidth is used in the code portion 1308 discussed below to identify the class variable, chartWidth, denoting the current chart width of all other charts or objects of the layout.

The elements 1306 and 1308 denote lines of code associated with a logical if-then-else statement.

The element 1306 denotes a code portion associated with the if-then portion of the statement where if the modulusOfVisibleChartsToNumberOfColumns (denoting the number of charts in the last row) is greater than or equal to 1, the width of each chart or other object in the last row, lastRowChartWidth, may be determined by dividing the container width by the number of charts in the last row (e.g., as determined in the line 1304). Thus, based on the code portion of 1306, if the modulusOfVisibleChartsToNumberOfColumns is equal to 1, then the last row of the layout includes a single chart or object and its width is then expanded to be equal to the container width denoting the view area width.

The element 1308 denotes a code portion associated with the else portion of the if then else statement. Thus, if the modulusOfVisibleChartsToNumberOfColumns (denoting the number of charts in the last row) is not greater than or equal to 1, the else code portion 1308 is executed where the width of each chart or other object in the last row, lastRowChartWidth, is assigned this.chartWidth. The variable this.chartWidth denotes the width of all other charts in the layout.

Figure 6A:
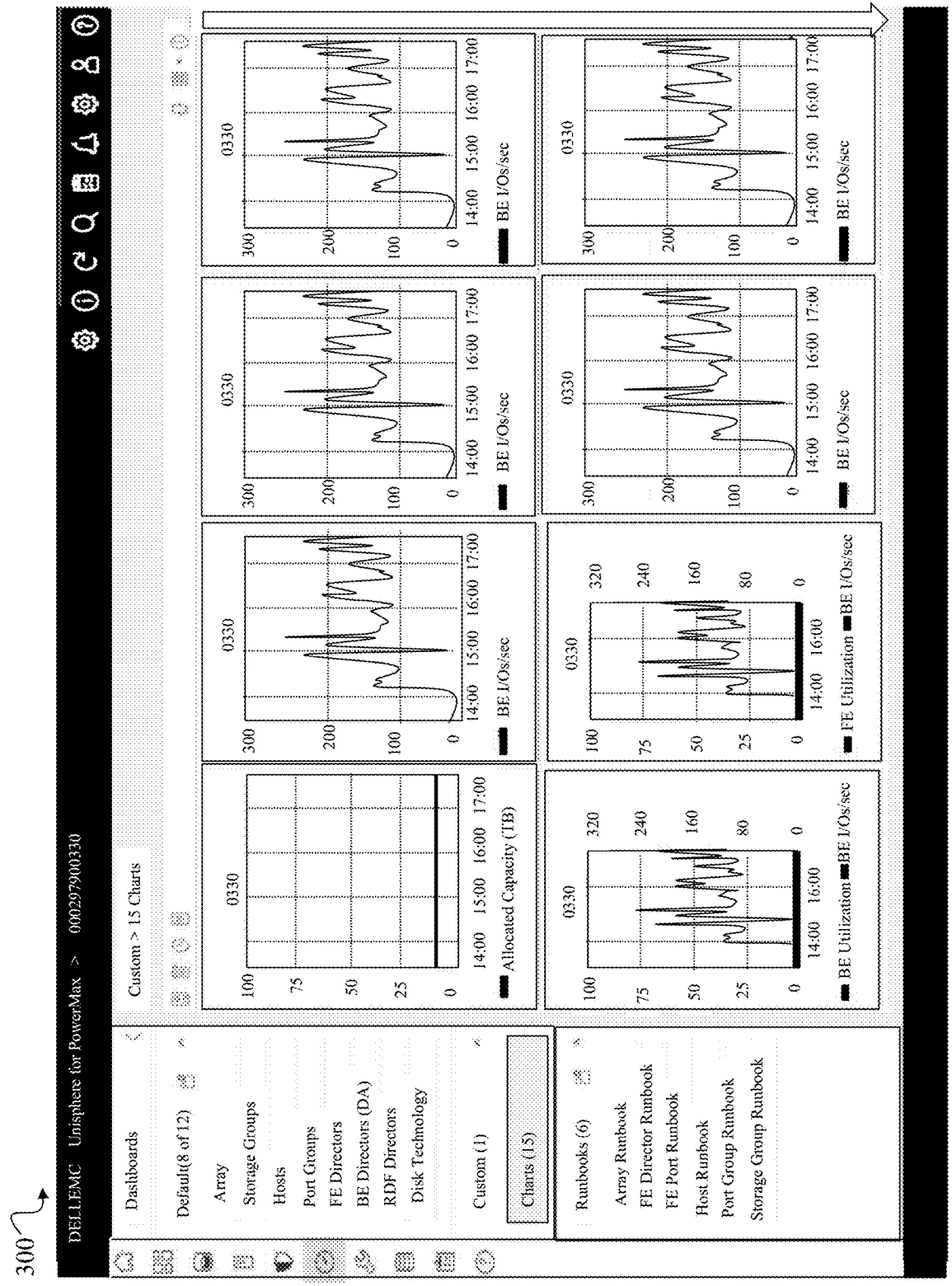
FIGS. 6A and 7A are examples illustrating unoptimized layouts not determined using the techniques herein.

Referring to FIG. 6A, shown is an example 300 illustrating an unoptimized display in at least one existing implementation not utilizing the techniques herein. In connection with FIG. 6A, there may be 15 charts to display in connection with a screen or monitor that is full HD resolution. However, as illustrated, one existing implementation not using the techniques herein may generate a layout that does not meet the three conditions or criteria described herein of an optimal or optimized layout. In particular, only 8 of the 15 charts are included in a single view area with the remaining 7 charts accessible for viewing by scrolling.

Figures 1, 6B:
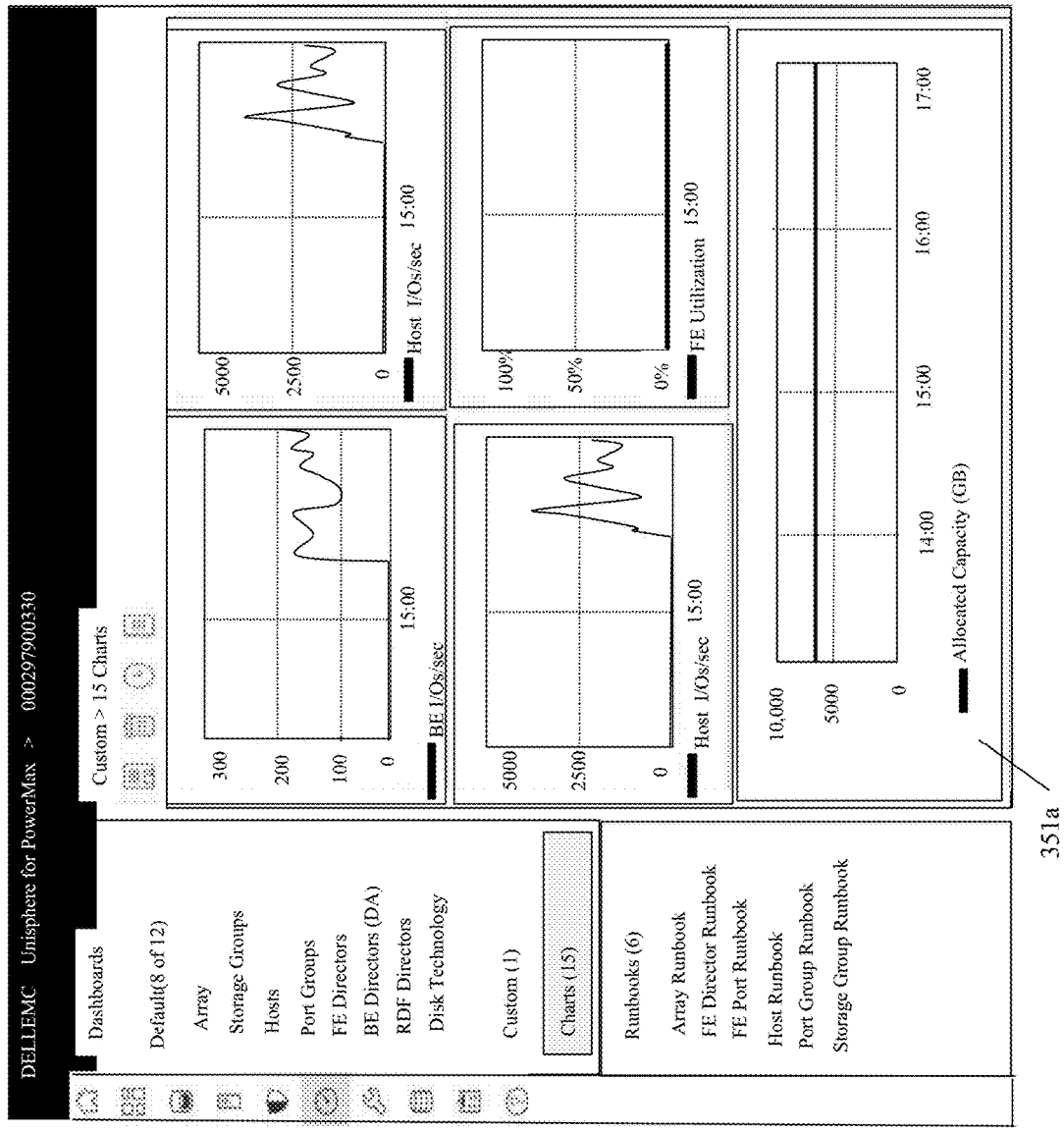
FIGS. 6B and 7B are examples illustrating optimized or optimal layout determined using the techniques herein.
Figures 2, 6B:
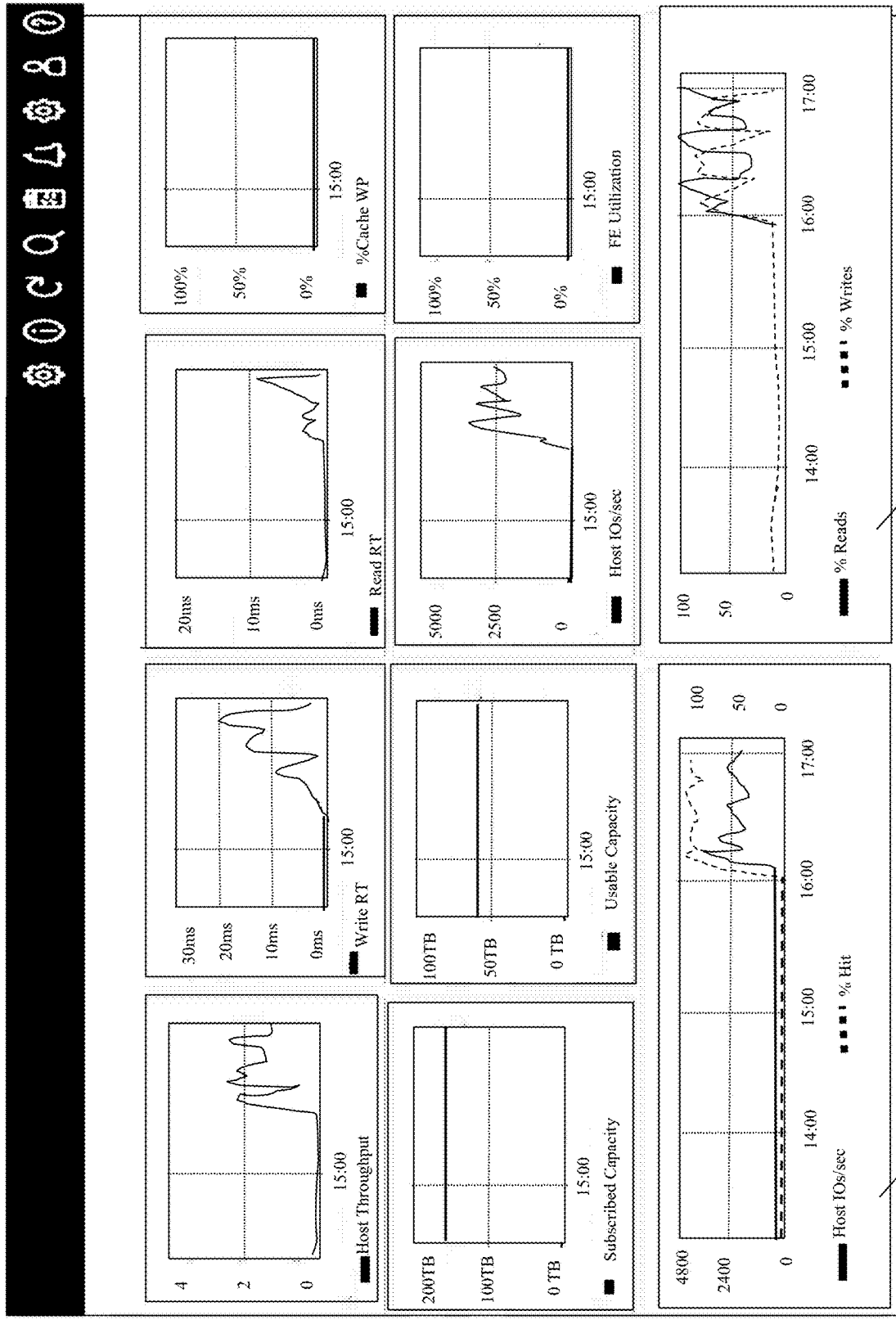

Referring to FIG. 6B, shown is an example 350 illustrating an optimized or optimal display in at least one embodiment using the techniques herein to determine the layout. In the example 350, the 15 charts are included in the same single view area and meet other specified conditions described herein that characterize an optimal or optimized layout determined using the techniques herein. Note that the last or bottom row also includes the 3 charts 351*a-c* which have had their associated widths expanded to fill out the width of the last row.

Figure 7A:
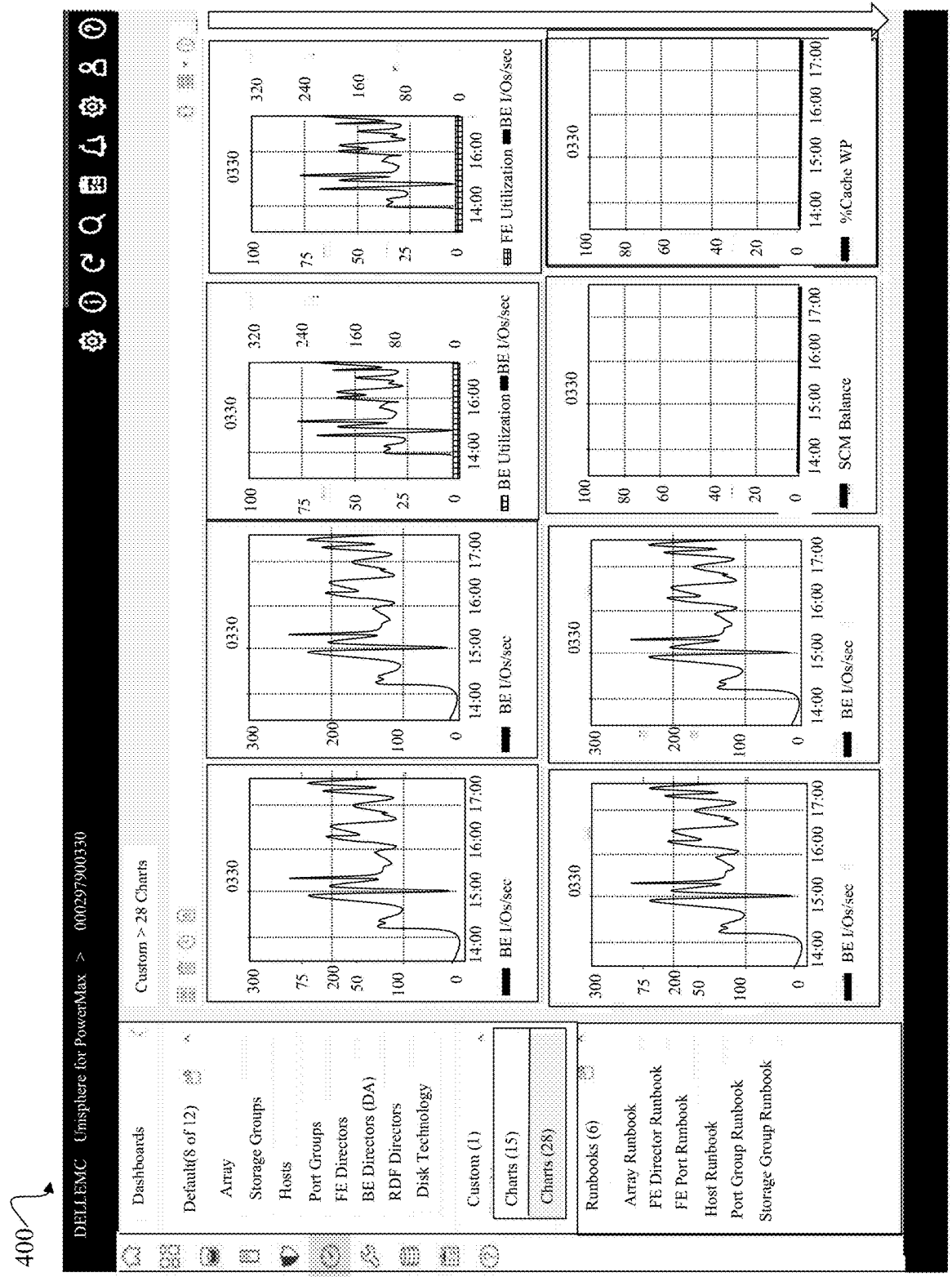

Referring to FIG. 7A, shown is an example 400 illustrating an unoptimized display in at least one existing implementation not utilizing the techniques herein. In connection with FIG. 7A, there may be 28 charts to display in connection with a screen or monitor that is has UW resolution. However, as illustrated, one existing implementation not using the techniques herein may generate a layout that does not meet the three conditions or criteria described herein of an optimal or optimized layout. In particular, only 8 of the 28 charts are included in a single view area with the remaining charts accessible for viewing by scrolling.

Figures 1, 7B:
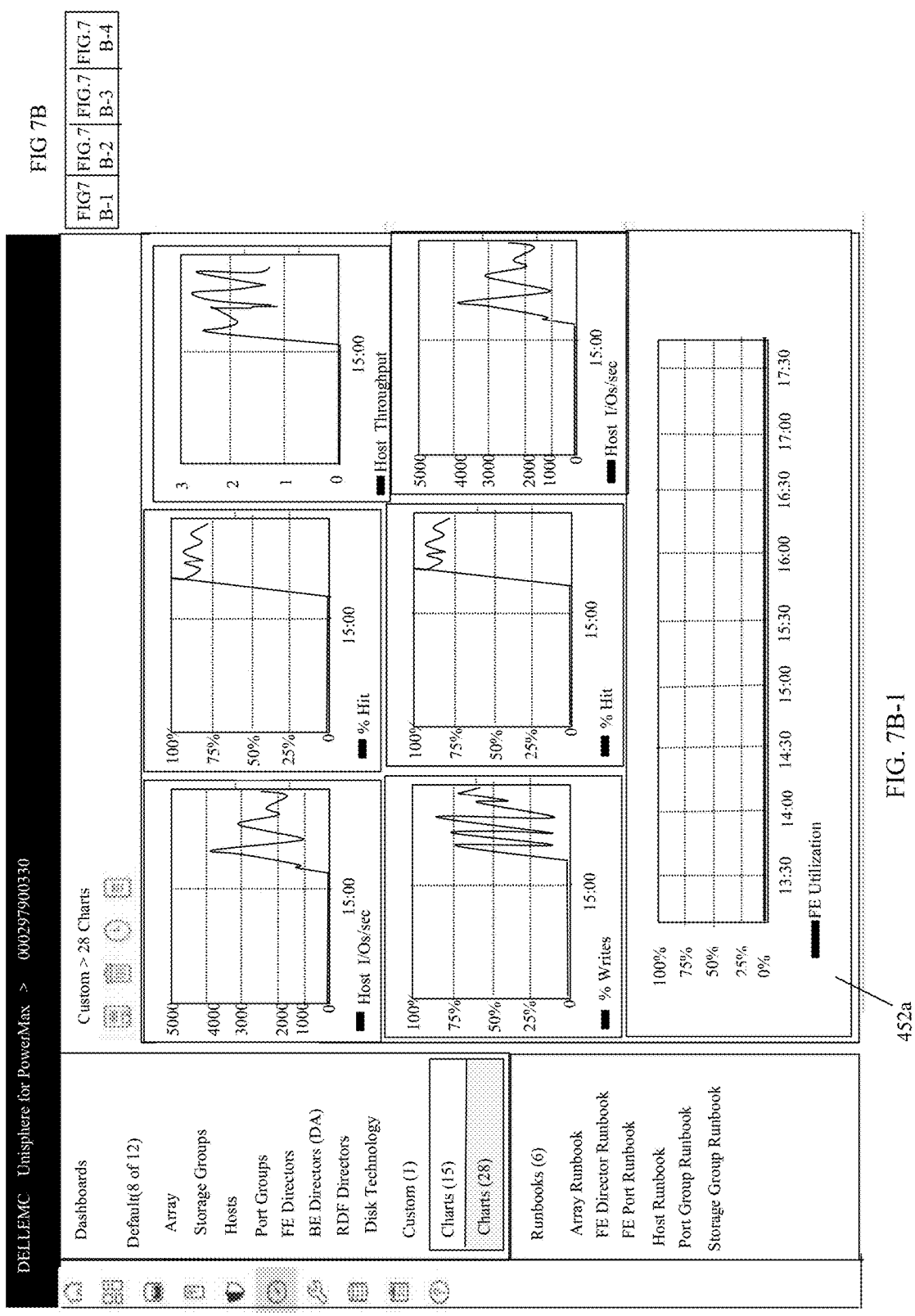
Figures 2, 7B:
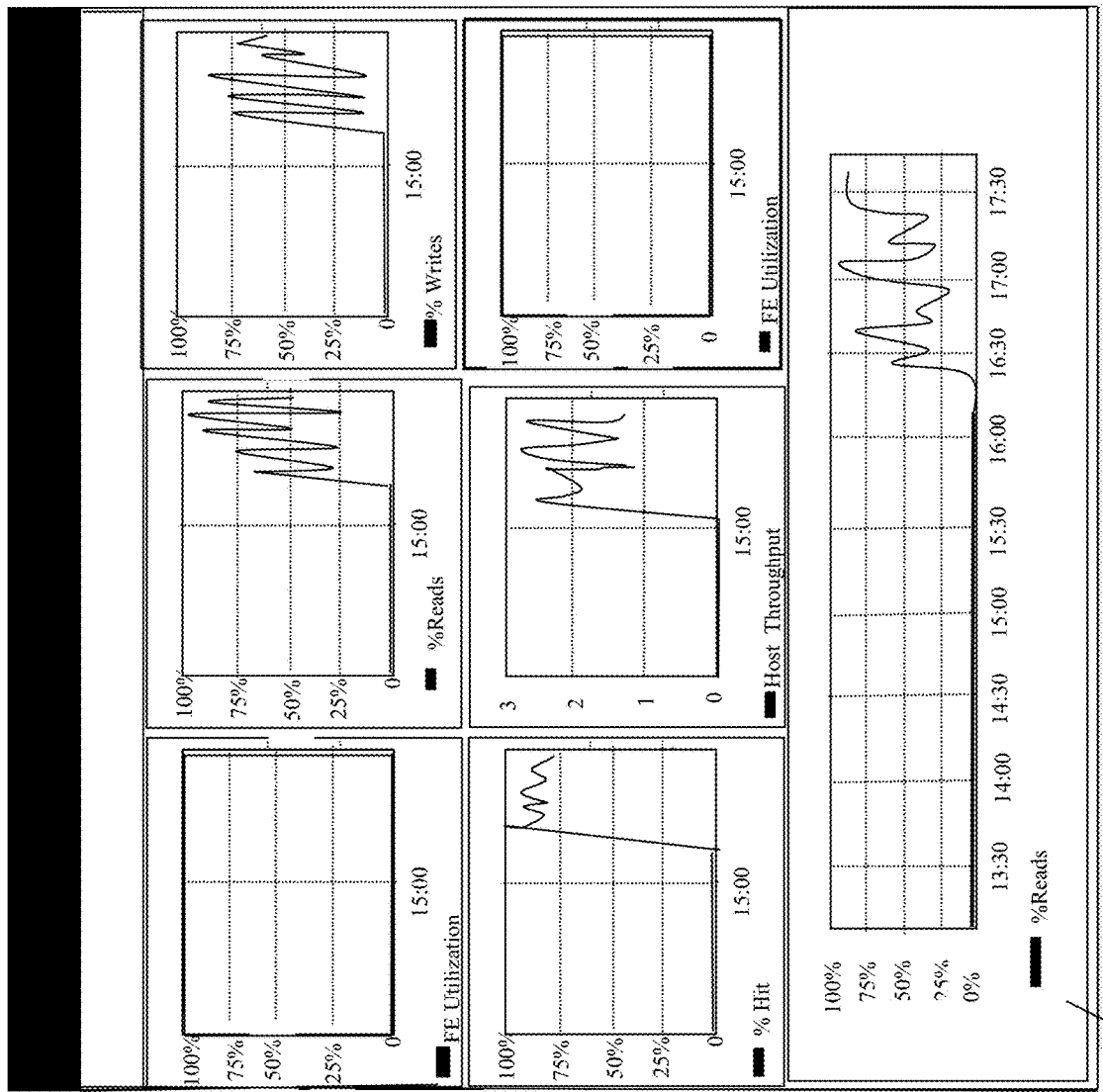
Figures 3, 7B:
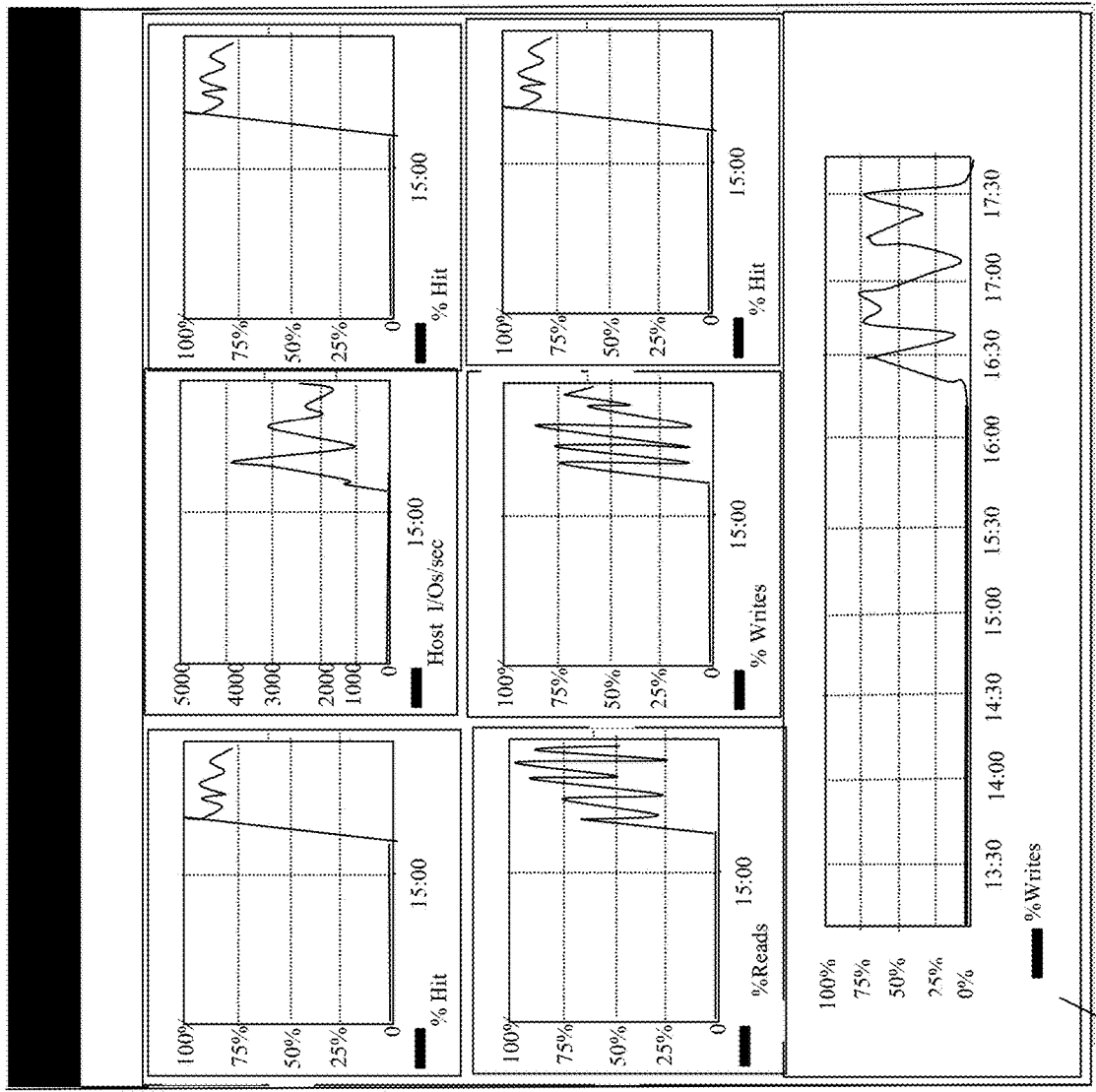
Figures 4, 7B:
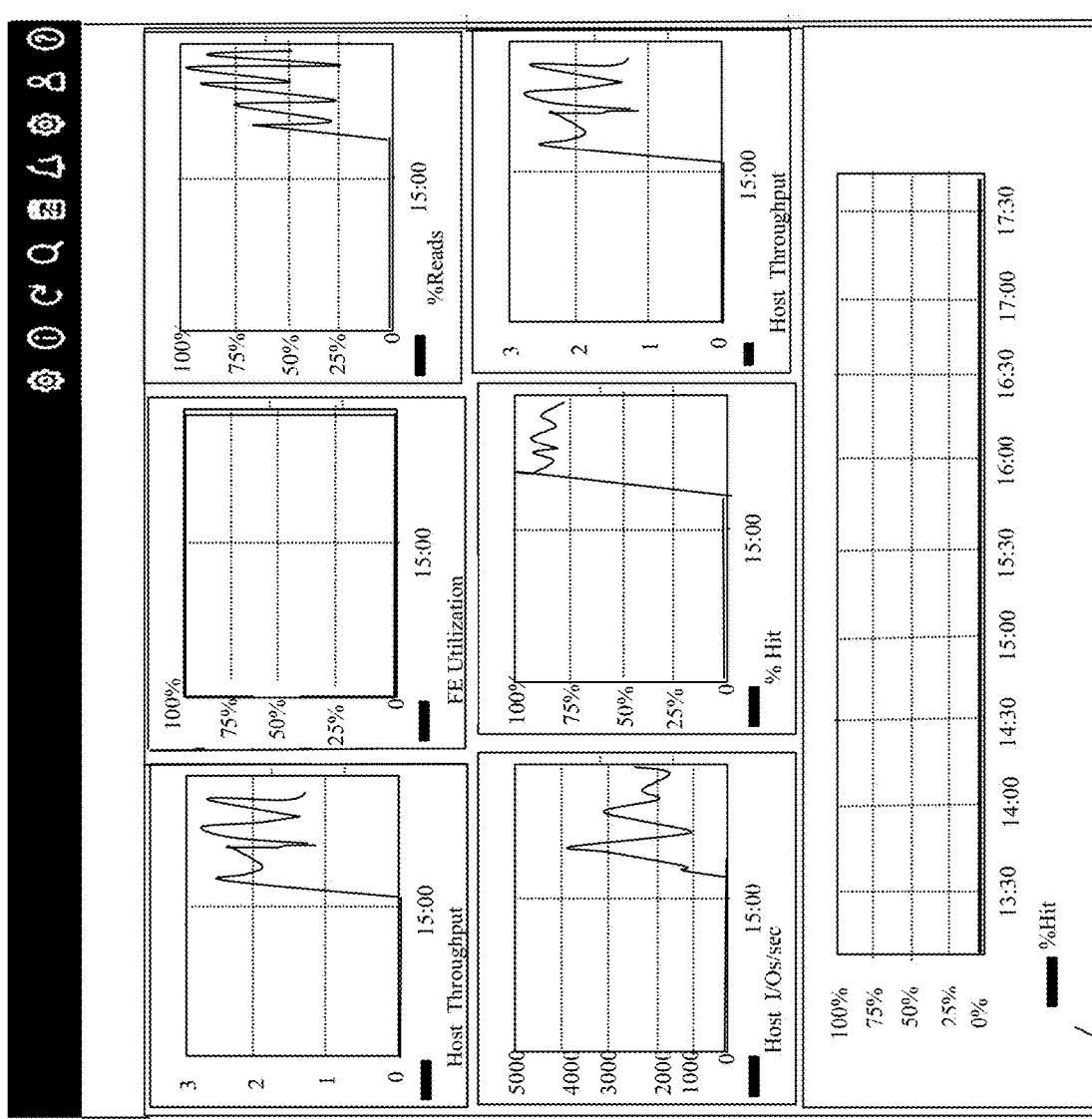

Referring to FIG. 7B, shown is an example 450 illustrating an optimized or optimal display in at least one embodiment using the techniques herein to determine the layout. In the example 450, the 28 charts are included in the same single view area and meet other specified conditions described herein that characterize an optimal or optimized layout determined using the techniques herein. Note that the last or bottom row also includes the 4 charts 452*a-d* which have had their associated widths expanded to fill out the width of the last row.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method of rendering a user interface (UI) comprising:
   receiving a plurality of inputs including a view area height, a view area width, a first integer denoting a count of a plurality of objects to be displayed, a minimum row height denoting a minimum object height, and a minimum object width, wherein a view area in which the plurality of objects is to be displayed has a height denoted by the view area height and a width denoted by the view area width;
   determining a maximum allowed number of columns in accordance with the view area width and minimum object width;
   determining a current number of rows in accordance with the view area height, a current number of columns, the minimum row height, and the first integer denoting a count of a plurality of objects to be displayed;
   determining whether the current number of rows and the current number of columns denote an optimized layout of the plurality of objects, wherein the optimized layout is in accordance with a plurality of conditions; and
   responsive to determining the current number of rows and the current number of columns denote an optimized layout, rendering the plurality of objects in the view area in accordance with the current number of rows and the current number of columns.

2. The computer-implemented method of claim 1, further comprising:
   responsive to determining the current number of rows and the current number of columns do not denote an optimized layout, performing first processing including:
      incrementing the current number of columns by one (1);
      determining whether the current number of columns is less than or equal to the maximum allowed number of columns;
      responsive to determining the current number of columns is less than or equal to the maximum allowed number of columns, determining an updated value for the current number of rows in accordance with the view area height, the current number of columns, the minimum row height, and the first integer denoting a count of a plurality of objects to be displayed; and
      responsive to determining the current number of columns is not less than or equal to the maximum allowed number of columns, determining that there is no optimized layout that meets the plurality of conditions, wherein the plurality of conditions includes a first condition that the number of objects be included in a layout in the view area without scrolling, a second condition that a number of columns of a layout not exceed the maximum allowed number of columns, and a third condition that each displayed object of the view area in accordance with a layout have an associated width dimension that is not less than the minimum object width and an associated height dimension that is not less than the minimum row height denoting the minimum object height.

3. The computer-implemented method of claim 1, wherein said determining the current number of rows in accordance with the view area height, the current number of columns, the minimum row height, and the first integer denoting a count of a plurality of objects to be displayed, further comprises:
   determining a first amount denoting a number of objects visible in a single view without scrolling, wherein the first amount is a mathematical product of a current number of rows and a current number of columns;
   determining whether the first integer is less than or equal to the first amount; and
   responsive to determining the first integer is less than or equal to the first amount, determining the current number of columns and the current number of rows denote an optimized layout.

4. The computer-implemented method of claim 3, wherein responsive to determining the first integer is not less than or equal to the first amount, performing first processing including:
   incrementing the current number of rows by one (1); and
   determining whether a current row height is greater than or equal to the minimum row height, wherein the current row height is the view area height divided by the current number of rows.

5. The computer-implemented method of claim 4, wherein the first processing further includes:
   responsive to determining the current row height is greater than or equal to the minimum row height, performing second processing, and wherein said second processing comprises:
      assigning the first amount, that denotes the number of objects visible without scrolling, an updated value that is a mathematical product of the current number of rows and the current number of columns;
      determining whether the first integer is less than or equal to the first amount; and
      responsive to determining the first integer is less than or equal to the first amount, determining that the current number of columns and the current number of rows denote an optimized layout.

6. The computer-implemented method of claim 5, wherein the first processing further comprises:
   responsive to determining the current row height is not greater than or equal to the minimum row height, performing third processing, wherein said third processing includes:
      determining the current number of columns and the current number of rows do not denote an optimized layout;
      incrementing the current number of columns by one (1);
      determining whether the current number of columns is less than or equal to the maximum allowed number of columns;

responsive to determining the current number of columns is less than or equal to the maximum allowed number of columns, determining an updated value for the current number of rows in accordance with the view area height, the current number of columns, the minimum row height, and the first integer denoting a count of a plurality of objects to be displayed; and responsive to determining the current number of columns is not less than or equal to the maximum allowed number of columns, determining that there is no optimized layout that meets the plurality of conditions, wherein the plurality of conditions includes a first condition that the number of objects be included in a layout in the view area, a second condition that a number of columns of a layout not exceed the maximum allowed number of columns, and a third condition that each displayed object have dimension that are not less than the minimum object width and the minimum row height denoting the minimum object height.

7. The computer-implemented method of claim 1, wherein the plurality of objects is rendered in the view area in a layout with the current number of rows and the current number of columns, and wherein the current number of rows is greater than 1 and wherein the current number of columns is greater than 1.

8. The computer-implemented method of claim 7, further comprising:

responsive to determining a last row of the current number of rows rendered includes more than 1 object, determining a second object width in accordance with dividing the view area width by a number of objects in the last row; and rendering each object of the last row to have a width equal to the second object width.

9. The computer-implemented method of claim 8, further comprising:

responsive to determining the last row includes a single object, rendering the single object of the last row to have a width equal to the view area width.

10. The computer-implemented method of claim 1, wherein the minimum row height denotes a first number of pixels, the minimum object width denotes a second number of pixels, the view area height denotes third number of pixels, and the view area width denotes a fourth number of pixels.

11. The computer-implemented method of claim 10, wherein the plurality of objects includes a plurality of charts.

12. The computer-implemented method of claim 10, wherein the plurality of objects includes a plurality of tables.

13. The computer-implemented method of claim 1, wherein the computer implemented method is performed in response to an occurrence of a trigger condition.

14. The computer-implemented method of claim 13, wherein the trigger condition is a UI interaction that results in resizing the view area.

15. The computer-implemented method of claim 14, wherein the trigger condition includes adding one or more objects to the view area.

16. The computer-implemented method of claim 14, wherein the trigger condition includes removing one or more objects from the view area.

17. The method of claim 2, further comprising:

responsive to determining that there is no optimized layout that meets the plurality of conditions, displaying a first portion of the plurality of objects in the view area with a remaining portion of the plurality of objects not visible in the view area, and wherein the remaining portion of the plurality of objects are available for viewing in the view area by scrolling.

18. A system comprising:

one or more processors; and one or more memories comprising code stored therein that, when executed, perform a method of rendering a user interface (UI) comprising:

receiving a plurality of inputs including a view area height, a view area width, a first integer denoting a count of a plurality of objects to be displayed, a minimum row height denoting a minimum object height, and a minimum object width, wherein a view area in which the plurality of objects is to be displayed has a height denoted by the view area height and a width denoted by the view area width;

determining a maximum allowed number of columns in accordance with the view area width and minimum object width;

determining a current number of rows in accordance with the view area height, a current number of columns, the minimum row height, and the first integer denoting a count of a plurality of objects to be displayed;

determining whether the current number of rows and the current number of columns denote an optimized layout of the plurality of objects, wherein the optimized layout is in accordance with a plurality of conditions; and responsive to determining the current number of rows and the current number of columns denote an optimized layout, rendering the plurality of objects in the view area in accordance with the current number of rows and the current number of columns.

19. A non-transitory computer readable medium comprising code stored thereon that, when executed, performs a method of rendering a user interface (UI) comprising:

receiving a plurality of inputs including a view area height, a view area width, a first integer denoting a count of a plurality of objects to be displayed, a minimum row height denoting a minimum object height, and a minimum object width, wherein a view area in which the plurality of objects is to be displayed has a height denoted by the view area height and a width denoted by the view area width;

determining a maximum allowed number of columns in accordance with the view area width and minimum object width;

determining a current number of rows in accordance with the view area height, a current number of columns, the minimum row height, and the first integer denoting a count of a plurality of objects to be displayed;

determining whether the current number of rows and the current number of columns denote an optimized layout of the plurality of objects, wherein the optimized layout is in accordance with a plurality of conditions; and responsive to determining the current number of rows and the current number of columns denote an optimized layout, rendering the plurality of objects in the view area in accordance with the current number of rows and the current number of columns.

* * * * *